United States Patent [19]

Sjöberg

[11] Patent Number: 4,977,401
[45] Date of Patent: Dec. 11, 1990

[54] HEAD-UP DISPLAY

[75] Inventor: Bengt E. Sjöberg, Linköping, Sweden

[73] Assignee: Saab-Scania Aktiebolag, Linkoping, Sweden

[21] Appl. No.: 403,285

[22] Filed: Sep. 7, 1989

[30] Foreign Application Priority Data

Sep. 7, 1988 [SE] Sweden ............................. 8803134

[51] Int. Cl.$^5$ ............................................. G01C 23/00
[52] U.S. Cl. .................................. 340/975; 340/980; 364/434
[58] Field of Search ............... 340/980, 975, 974, 705; 73/178 R; 244/181; 364/434; 350/174

[56] References Cited

U.S. PATENT DOCUMENTS 3,711,826 1/1973 La Russa .............................. 340/980
4,825,194 4/1989 Rasinski ............................... 340/975

FOREIGN PATENT DOCUMENTS 8706043 10/1987 PCT Int'l Appl. ................. 340/980
2065053 6/1981 United Kingdom ............... 340/980

Primary Examiner—Joseph A. Orsino
Assistant Examiner—Brent A. Swarthout
Attorney, Agent, or Firm—Lowe, Price, LeBlanc, Becker and Shur

[57] ABSTRACT

A head-up display for indicating the attitude and flight-path angle vertically, the attitude in roll and preferably the heading attitude and heading track angle of a vehicle, preferably an air vehicle, which in addition to the inertial navigation (5) for determining said attitudes and angles comprises a transparent but partly reflecting plate (10), a so-called "combiner glass" glass for projecting a corresponding display together with at least one symbol (14) of the x-axis of the vehicle. Particularly characteristic is that the head-up-display is arranged to show the display (12) as at least a portion of the inside of a space-stable sphere with its center in said vehicle, the display being provided with latitude circles (15, 16, 19, 20) and preferably meridian markings (18).

5 Claims, 4 Drawing Sheets

{ "page": "4,977,401" }

HEAD-UP DISPLAY

FIELD OF INVENTION

This invention relates to indicating instruments and more particularly relates to a head-up-display for indicating the attitude and flight-path angle vertically, the attitude in roll and preferably the heading attitude and heading track angle of a vehicle, preferably an air vehicle. The vehicle carries means for determining said attitudes and flight-path and track angles and for emitting corresponding first signals. The head-up-display comprises a screen and means for transforming said signals to a corresponding indicator picture, which is projected together with at least one symbol of the velocity vector of the vehicle, preferably also a symbol of the x-axis of the vehicle, onto the screen, which consists of a transparent but reflecting plate for the projected indicator picture and symbols.

BACKGROUND OF THE INVENTION

Head-up-displays have long been used in military aircraft. First a symbol of the velocity vector of the aircraft is projected via a plate, which may be called a "reflecting glass". The symbol indicates the flight-path angle of the aircraft partly with the horizontal plane, flight-path angle $\gamma$, and partly with a meridian, track angle $\chi$. The attitude angles, i.e. the Euler angles of the aircraft body relative to the horizontal plane, the roll angle $\Phi$ and pitch angle $\theta$, and also usually the heading angle $\psi$, are also generally presented by the corresponding symbols.

However, such head-up-displays only present straight lines for indicating pitch and roll attitudes and therefore represent only two of the three Euler angles required for a complete indication of the flight attitude. This means that the aircraft pilot during advanced flying manoeuvers such as dive and climb does not get an altogether complete picture of his three-dimensional flight attitude relative to the surroundings, which can lead to risks of insufficient understanding of the actual flight attitude when surrounding references are lacking for a short or long time, e.g. in clouds, fog or in the dark. Particularly in near vertical climbs or dives these indicators give a misleading picture of rotations in roll. There are known panel-mounted indicators of the kind described in the Swedish Pat. No.8300065-3, comprising e.g. an IN-platform controlled "three-axle" ball for all three Euler angles $\Phi$, $\theta$, and $\psi$ with latitude markings on the outside, distinguishable for up and down. These indicators require that the aircraft pilot lower his eyes down in the cabin to the front panel ("Head Down") and therefore lose the possibility of being constantly in contact with the surroundings.

SUMMARY OF THE INVENTION

The object of the present Invention is therefore to provide a head-up-display of the type described above which conveys to the vehicle operator very clear, immediately perceptible reference information for the three-dimensional flying situation, which operates in all possible flying situations and in advanced maneuvers, so that the operator can take advantage of every possibility of visual contact with the surroundings when this is possible, i.e. when going in and out of clouds or during close tracking of another aircraft when visibility of the surroundings is poor.

According to the invention a head-up-display of the type mentioned is characterized in that it is arranged to show the indicator picture as at least a portion of the inside of a space-stable sphere with its center in said vehicle, the indicator picture being provided with latitude circles and preferably meridian markings as well.

In a preferred embodiment of a head-up-display according to the invention, the latitude circles for the indication of attitude and flight-path angle vertically from 0° to −90°, i.e. for dive, are marked so as to clearly differ from the latitude circles for indicating attitude and flight-path angle vertically from 0° to +90°, i.e. for climb, the horizontal line being distinguishably marked.

In a further suitable embodiment of the head-up-display, the zenith of said sphere corresponding to the attitude vertically +90°, and nadir of said sphere corresponding to the attitude vertically −90° are marked with characteristic symbols easily distinguishable from each other, each preferably including north-south and east-west indications.

In another suitable embodiment the head-up-display is arranged to show the indicator picture so that an observer, particularly an aircraft pilot, will see it essentially integrated with, and in the same picture plane as the surroundings that are visible through said plate and the front screen of the vehicle, on the angular scale 1:1.

The symbol of the aircraft velocity vector and when appropriate the symbol of the x-axis of the aircraft are shown by the head-up-display in the picture plane.

BRIEF DESCRIPTION OF THE DRAWINGS

The invention will now be described in more detail with reference to the accompanying drawing figures, of which.

DESCRIPTION OF THE PREFERRED EMBODIMENT

Figure 1:
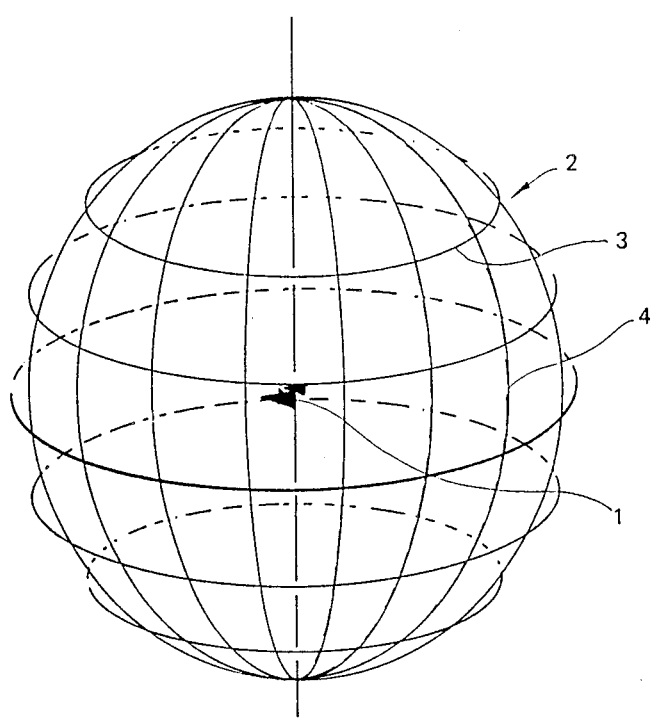
FIG. 1 shows the principle of the invention with a vehicle in the center of a space stable sphere.

In FIG. 1 there is shown an aircraft 1 located in the center of an imaginary, space-stable sphere 2 with latitude circles 3 and meridian markings 4. An aircraft pilot therefore sees the inside of a sphere which is the principle of the head-up-display according to the invention.

Figure 2:
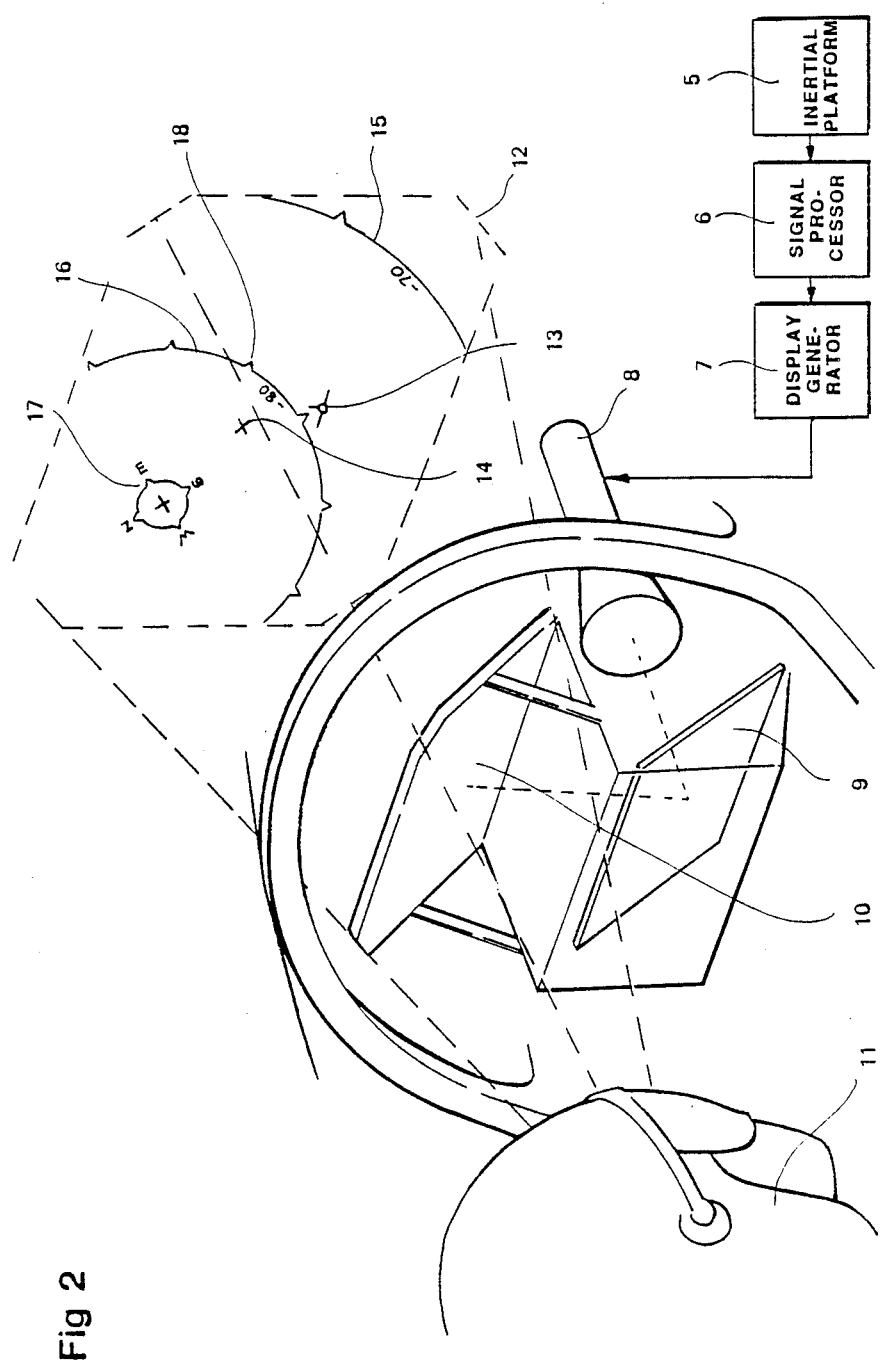
FIG. 2 shows schematically a head-up-display according to the invention, with the IN-platform, the signal processing unit, the picture producer, the cathode-ray-tube and combiner glass of the aircraft.
Figure 6:
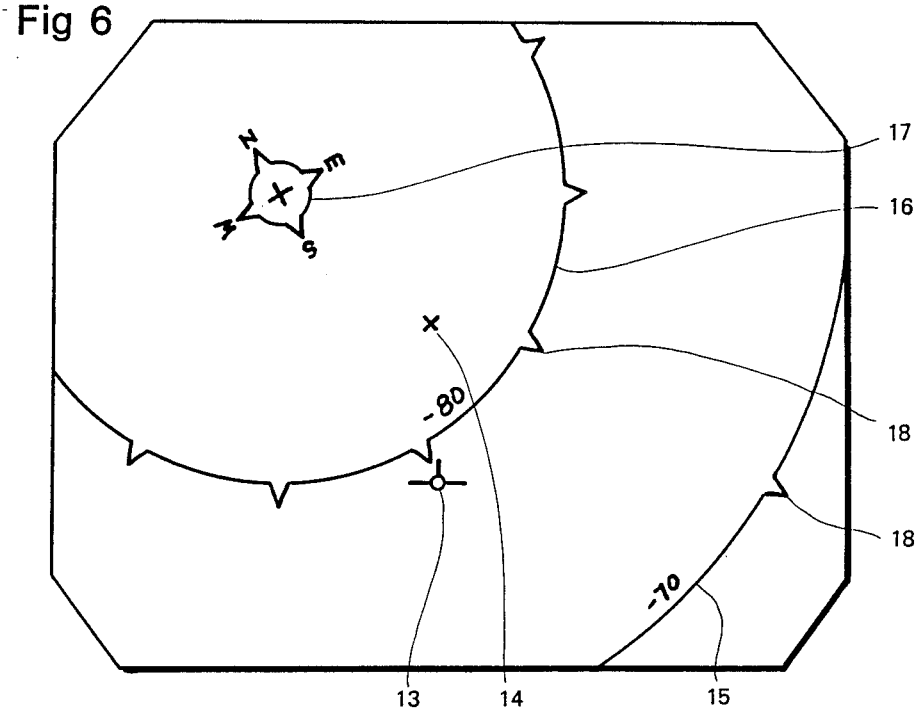

A head-up-display according to the invention is illustrated in FIG. 2. In FIG. 2, 5 designates the inertial navigation platform, 6 a signal processing unit and 7 a picture producer or display generator, which via a cathode-ray-tube 8 and a mirror 9 projects an indicating display in the form of the inside of a sphere on a display in the form of a transparent but reflecting plate for the projected display which in this context is called a combiner glass 10. The aircraft pilot sees the indicator picture or display as shown in a display plane 12 at a certain distance. A symbol 13 of the velocity vector of the aircraft and a symbol 14 of the x-axis of the aircraft are projected in the same display plane 12. The display - which for the flight attitude that is shown in FIG. 2 is more clearly illustrated in FIG. 6—involves dive with a flight-path angle close to −80°. The latitude circles 15 and 16, and −70° and −80°, respectively, and a nadir symbol 17 are displayed. The latter is formed with clear north-south and east-west markings, respectively. The meridian markings 18 are also indicated on the latitude circles 15 and 16. The scale of the indicator picture or display is such that the angle between a sight line to a latitude circle with the marking $\alpha°$ and a sight line to a latitude circle with the marking $\alpha°+\beta°$ is in effect $\beta°$, and therefore the angular scale appears to be 1:1.

Figure 5:
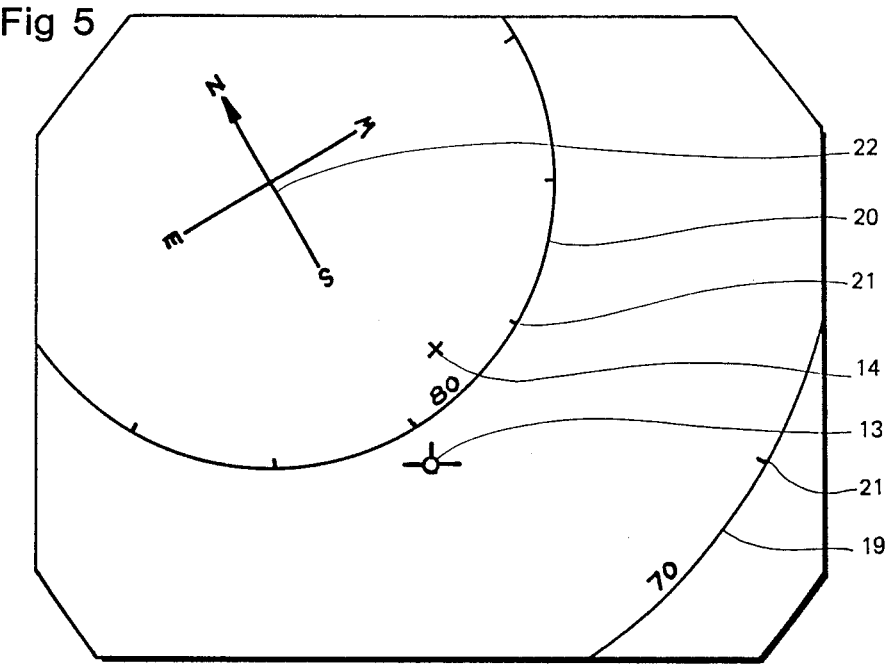

A corresponding indicator picture during climb with a flight-path angle close to 80° is illustrated in FIG. 5, and shows latitude circles 19 and 20, each with meridian markings 21. A zenith symbol is designated by 22, and is formed with clear north-south and east-west markings. It is to be observed that the nadir symbol 17 and the zenith symbol 22 so differ from each other that it is easy immediately to get an idea of whether the flying situation involves dive or climb. In addition the meridian markings 18 for negative latitude circles differ from the meridian markings 21 for positive latitude circles.

Figure 3:
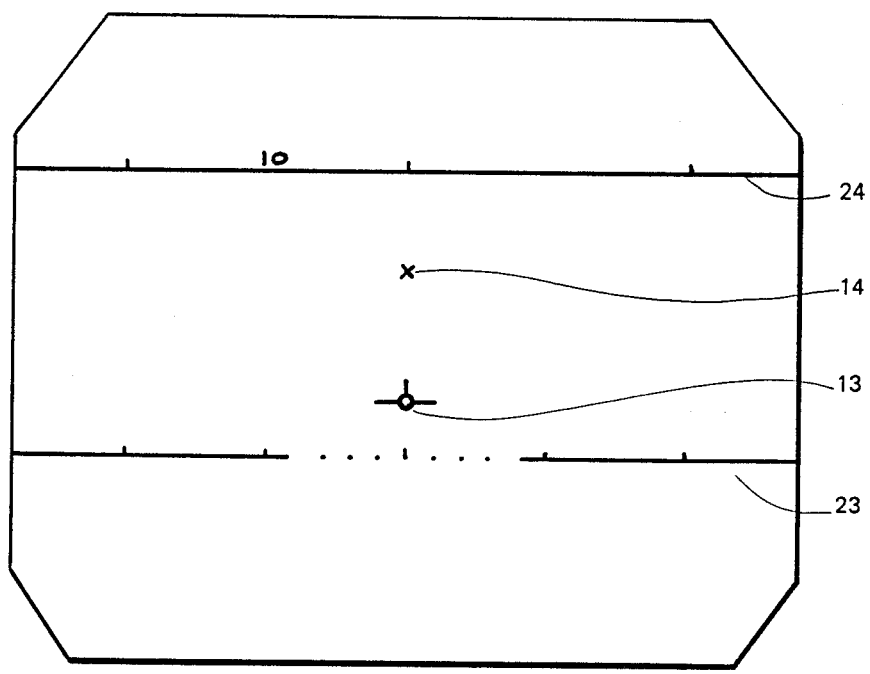
FIGS. 3 through 6 show, respectively, an indicator picture with a symbol of the velocity vector and a symbol of the x-axis during flight
 relatively low above the horizontal plane
 at climb with a flight-path angle close to 50°
 at climb with a flight-path angle close to 80°
 at dive with a flight-path angle close to −80°
Figure 4:
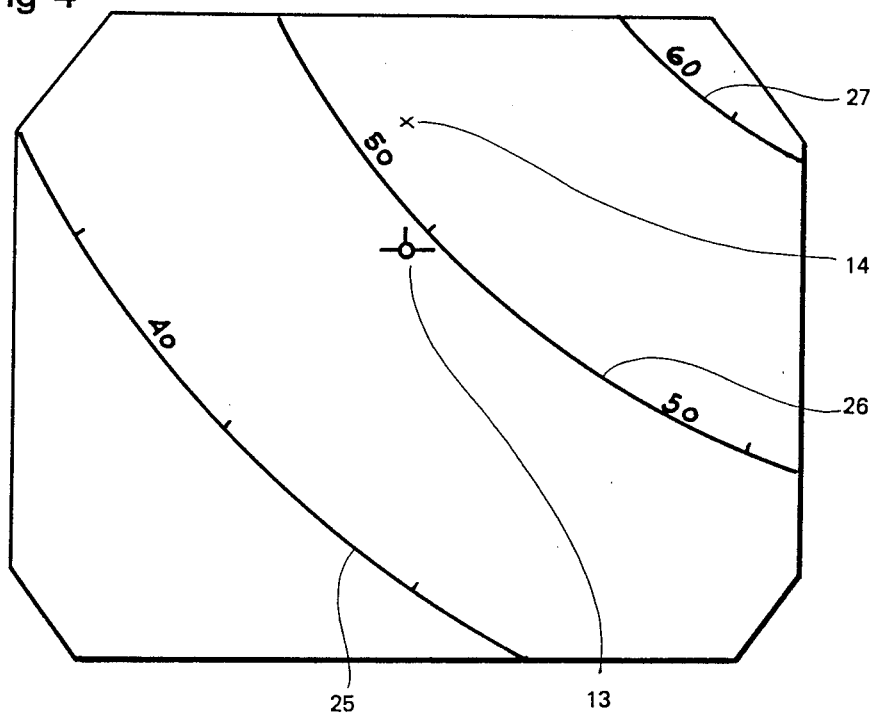

In FIG. 3 the latitude circles are shown for 0° and 10° when flying relatively low above the horizontal plane and in FIG. 4 the latitude circles are shown for 40, 50 and 60° at climb with a flight-path angle close to 50°.

I claim:

1. A head-up-display for indicating the attitude and flight-path angle vertically, the attitude in roll and the heading attitude of an air vehicle, the vehicle having means (5,6) for determining said attitudes and flight-path angle and for emitting corresponding first signals, the head-up-display comprising a screen (10) and means (7,8) for translating said signals to a corresponding display, which is projected together with at least one symbol (13) of a velocity vector of the vehicle, and a symbol (14) of the x-axis of the vehicle, on the screen, said screen comprising a transparent but reflecting plate for the indicator display and said symbols, characterized in that the head-up-display is arranged to present the display (12) as a depiction of at least a portion of the inside of a space-stable sphere with its center in said vehicle, the display depicting at least portions of latitude circles, (15, 16, 19, 20), the nadir of the circles increasing the further away a circle is from the zenith or nadir of the sphere, and meridian markings (18) adjacent said circles.

2. A head-up-display according to claim 1, characterized in that the latitude circles (15, 16) for the indication of attitude and flight-path angle vertically from 0° to −90° for dive, are marked to differ from the latitude circles (19, 20) for the indication of the attitude and flight-path angle vertically from 0° to +90° for climb, and including a horizontal line (23) distinguishably marked.

3. A head-up display according to claim 1 characterized in that the zenith (22) of said sphere corresponding to the attitude vertically +90°, and nadir (17) of said sphere corresponding to the attitude vertically −90° are marked with characteristic symbols easily distinguishable from each other, and each including north-south and east-west indications.

4. A head-up-display according to claim 3, characterized in that the head-up-display is arranged to show the display (12) so that an observer, particularly an aircraft pilot, will see said display essentially integrated with, and in the same picture plane as the surroundings visible through said plate and the front screen of the vehicle, on the angular scale 1:1.

5. A head-up-display according to claim 4, characterized in that said symbol (13) of the aircraft velocity vector and the symbol (14) of the x-axis of the aircraft are shown by the head-up-display in said picture plane.

* * * * *